United States Patent
Sun et al.

(10) Patent No.: US 9,681,392 B2
(45) Date of Patent: Jun. 13, 2017

(54) METHOD, DEVICE, AND SYSTEM FOR CONFIGURING CELL RANGE EXPANSION BIAS

(71) Applicant: Huawei Technologies Co., Ltd., Shenzhen (CN)

(72) Inventors: Yanzan Sun, Shenzhen (CN); Tianle Deng, Shanghai (CN); Binsong Tang, Shanghai (CN); Haiyan Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/537,162

(22) Filed: Nov. 10, 2014

(65) Prior Publication Data

US 2015/0065192 A1    Mar. 5, 2015

Related U.S. Application Data

(63) Continuation of application No. PCT/CN2012/075323, filed on May 11, 2012.

(51) Int. Cl.
| | |
|---|---|
| *H04W 24/00* | (2009.01) |
| *H04W 52/24* | (2009.01) |
| *H04W 16/26* | (2009.01) |
| *H04W 52/54* | (2009.01) |
| *H04W 16/08* | (2009.01) |

(Continued)

(52) U.S. Cl.
CPC ........... *H04W 52/24* (2013.01); *H04W 16/08* (2013.01); *H04W 16/26* (2013.01); *H04W 52/40* (2013.01); *H04W 52/54* (2013.01); *H04W 52/343* (2013.01)

(58) Field of Classification Search
CPC ............. H04W 84/045; H04W 72/042; H04W 72/0453; H04W 72/1231; H04W 52/244; H04W 72/0406; H04W 72/082; H04W 72/085; H04W 16/26; H04W 4/22
USPC ......... 455/422.1, 423, 436, 437, 448, 456.1, 455/513, 517, 522, 561; 370/241, 252, 370/254, 329, 331
See application file for complete search history.

(56) References Cited

U.S. PATENT DOCUMENTS

2010/0135272 A1    6/2010  Dayal et al.
2011/0249579 A1   10/2011  Hu et al.
(Continued)

FOREIGN PATENT DOCUMENTS

| CN | 102232323 A | 11/2011 |
|---|---|---|
| CN | 102395148 A | 3/2012 |

(Continued)

OTHER PUBLICATIONS

Huawei, "ABS Reduced Power in FeICIC," 3GPP TSG-RAN WG3 Meeting #75, R3-120075, Feb. 6-10, 2012, 4 pages.

(Continued)

*Primary Examiner* — Shaima Q Aminzay
(74) *Attorney, Agent, or Firm* — Slater Matsil, LLP (57) ABSTRACT

Embodiments of the present invention disclose a method, a device, and a system for configuring cell range expansion bias. A method includes determining, by a first base station, cell range expansion biases under different ABS transmit powers, and sending, by the first base station, the cell range expansion biases under different ABS transmit powers to a second base station or a network management system.

20 Claims, 4 Drawing Sheets

(51) Int. Cl.
*H04W 52/40* (2009.01)
*H04W 52/34* (2009.01)

(56) References Cited

U.S. PATENT DOCUMENTS

| | | |
|---|---|---|
| 2011/0310830 A1 | 12/2011 | Wu et al. |
| 2012/0113844 A1* | 5/2012 | Krishnamurthy ..... H04L 1/0026 370/252 |
| 2012/0275394 A1* | 11/2012 | Gunnarsson ........ H04W 28/048 370/329 |

FOREIGN PATENT DOCUMENTS

| | | |
|---|---|---|
| CN | 102440050 A | 5/2012 |
| EP | 0685126 B1 | 6/1997 |
| EP | 1223676 A2 | 7/2002 |
| EP | 1592127 A1 | 11/2005 |
| JP | 2013532913 A | 8/2013 |
| WO | 2012020851 A1 | 2/2012 |
| WO | 2012053240 A1 | 4/2012 |

OTHER PUBLICATIONS

Tian, P., et al., "An Adaptive Bias Configuration Strategy for Range Extension in LTE-Advanced Heterogeneous Networks," Proceedings of ICCTA 2011, Jan. 2011, 5 pages.

Panasonic, "Performance Study on ABS with Reduced Macro Power," 3GPP TSG-RAN WG1 Meeting #67, R1-113806, Nov. 14-18, 2011, 9 pages.

* cited by examiner

METHOD, DEVICE, AND SYSTEM FOR CONFIGURING CELL RANGE EXPANSION BIAS

This application is a continuation of International Application No. PCT/CN2012/075323, filed on May 11, 2012, which is hereby incorporated by reference in its entirety.

TECHNICAL FIELD

The present invention relates to the field of communications and, in particular embodiments, to a method, a device, and a system for configuring cell range expansion bias.

BACKGROUND

A third generation partnership project (3GPP) introduces a cell range expansion (CRE) mechanism to a heterogeneous network. By adjusting a cell range expansion bias (CRE bias) of a pico cell (Pico Cell), cell range expansion of the Pico cell in a macro cell is implemented, and a UE in the macro cell is further offloaded into the Pico cell to reduce load of the macro cell, so as to improve use efficiency of frequency spectrum and increase network capacity. Meanwhile, an MeNB seriously interferes with a UE in a Pico CRE expansion area after the Pico cell uses the CRE expansion. To solve an interference problem, the 3GPP introduces an interference coordination mechanism of enhancement of the inter-cell interference coordination (eICIC) in a time domain, that is, almost blank subframe (ABS), with an aim to solve a control channel interference problem at the time of mixed deployment of base stations.

In the prior art, a configuration solution for CRE bias of a Pico cell is configuring CRE bias for Pico cells within MeNB coverage in a unified manner.

However, if the CRE bias is a unified value, for different Pico cells, when the CRE Bias is configured to a relatively small value, the Pico cell CRE range is small and few UEs of the macro cell are unmounted to the Pico cell, which is not beneficial to reduce the load of the macro cell; when the CRE Bias is configured to a relatively large value, a signal to interference plus noise ratio (SINR, Signal to Interference plus Noise Ratio) of a UE unmounted to the Pico cell may be smaller than a minimum SINR of a decoding control channel of the UE, causing call drop of the UE.

SUMMARY

Embodiments of the present invention provide a method, a device, and a system for configuring cell range expansion bias, so as to configure a CRE bias according to a CRE bias determined by a first base station, thereby avoiding network resource waste or UE call drop due to unified configuration of the CRE bias for the first base station.

A method for configuring cell range expansion bias is provided by an embodiment of the present invention. A first base station determines cell range expansion biases under different almost blank subframe ABS transmit powers. The first base station sends the cell range expansion biases under the different almost blank subframe ABS transmit powers to a second base station or a network management system.

A method for configuring cell range expansion bias is provided by embodiment of the present invention. A second base station or a network management system receive cell range expansion biases under different almost blank subframe ABS transmit powers. The second base station or the network management system configures cell range expansion biases under different ABS transmit powers for a first base station according to the cell range expansion biases under different ABS transmit powers. The cell range expansion biases under different ABS transmit powers are determined by the first base station.

A device for configuring cell range expansion bias is provided by an embodiment of the present invention. A determining unit is adapted to determine cell range expansion biases under different almost blank subframe ABS transmit powers. A sending unit is adapted to send the cell range expansion biases under the different almost blank subframe ABS transmit powers to a second base station or a network management system.

A device for configuring cell range expansion bias is provided by an embodiment of the present invention. A receiving unit is adapted to receive cell range expansion biases under different almost blank subframe ABS transmit powers. A configuring unit is adapted to configure, according to the cell range expansion biases under different ABS transmit powers, cell range expansion biases under different ABS transmit powers for a first base station. The cell range expansion biases under different ABS transmit powers are determined by the first base station.

A system for configuring cell range expansion bias is provided by embodiment of the present invention. A first base station is adapted to determine cell range expansion biases under different almost blank subframe ABS transmit powers and to send the cell range expansion biases under different almost blank subframe ABS transmit powers to a second base station or a network management system. The second base station or the network management system is adapted to receive the cell range expansion biases under different almost blank subframe ABS transmit powers and to configure, according to the cell range expansion biases under different ABS transmit powers, cell range expansion biases under different ABS transmit powers for the first base station. The cell range expansion biases under different ABS transmit powers are determined by the first base station.

It can be seen from the foregoing technical solutions that the embodiments of the present invention have the following advantages. A first base station determines CRE biases under different ABS transmit powers, and sends the cell range expansion biases under different almost blank subframe transmit powers to a second base station or a network management system; therefore, the first base station determines the CRE biases under different ABS transmit powers and sends the CRE biases to the second base station or the network management system, and the second base station or the network management system configures CRE biases respectively according to the CRE biases determined by the first base station, so that the CRE bias configuration is more reasonable, thereby avoiding network resource waste due to a too small CRE bias or UE call drop due to a too large CRE bias.

DETAILED DESCRIPTION OF ILLUSTRATIVE EMBODIMENTS

A CRE bias value is affected by multiple factors, for example, because an ABS and a non almost blank subframe (Non-ABS, Non Almost Blank Subframe) have different powers and a Pico cell and an MeNB have different path losses, the Pico cell undergoes different interferences in the ABS and the Non-ABS, at the same time, the Pico cell and the MeNB have different loads, and the CRE bias has different performance requirements on user handovers between the MeNB and the Pico cell. Therefore, embodiments of the present invention provide a method, a device, and a system for configuring cell range expansion bias, so as to reasonably configure CRE biases under different ABS transmit powers, thereby avoiding network resource waste or UE call drop due to the fact that the CRE bias is configured to a too small value or a too large value. Details are provided hereinafter.

Figure 1:
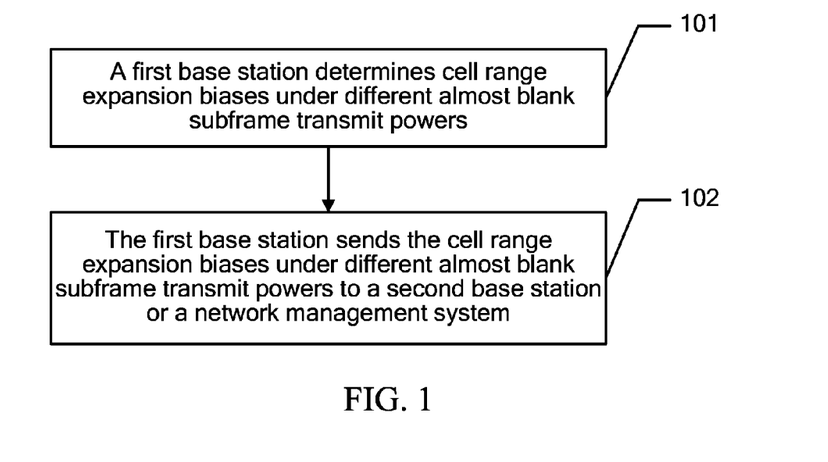
FIG. 1 is a schematic diagram of an embodiment of a method for configuring cell range expansion bias according to an embodiment of the present invention.

Referring to FIG. 1, an embodiment of a method for configuring cell range expansion bias provided by an embodiment of the present invention includes the following steps.

101. A first base station determines cell range expansion biases under different almost blank subframe ABS transmit powers.

The cell range expansion bias is used by a second base station or a network management system to configure the cell expansion biases under different ABS transmit powers for the first base station.

102. The first base station sends the cell range expansion biases under different almost blank subframe transmit powers to the second base station or the network management system.

In the embodiment of the present invention, the first base station determines the cell range expansion biases under the different almost blank subframe ABS transmit powers, where the cell range expansion biases are used by the second base station or the network management system to perform different configuration of the cell range expansion biases under the different ABS transmit powers for the first base station; and the first base station sends the cell range expansion biases under different ABS transmit powers to the second base station or the network management system. Therefore, the first base station determines the CRE biases under the different ABS transmit powers for the first base station itself, and sends the CRE biases to the second base station or the network management system, and the second base station or the network management system configures the CRE biases respectively according to the CRE biases determined by the first base station. In this way, the CRE bias configuration is more reasonable, which can reduce network resource waste due to a too small CRE bias configured in a unified manner or UE call drops due to a too large CRE bias configured in a unified manner.

Figure 2:
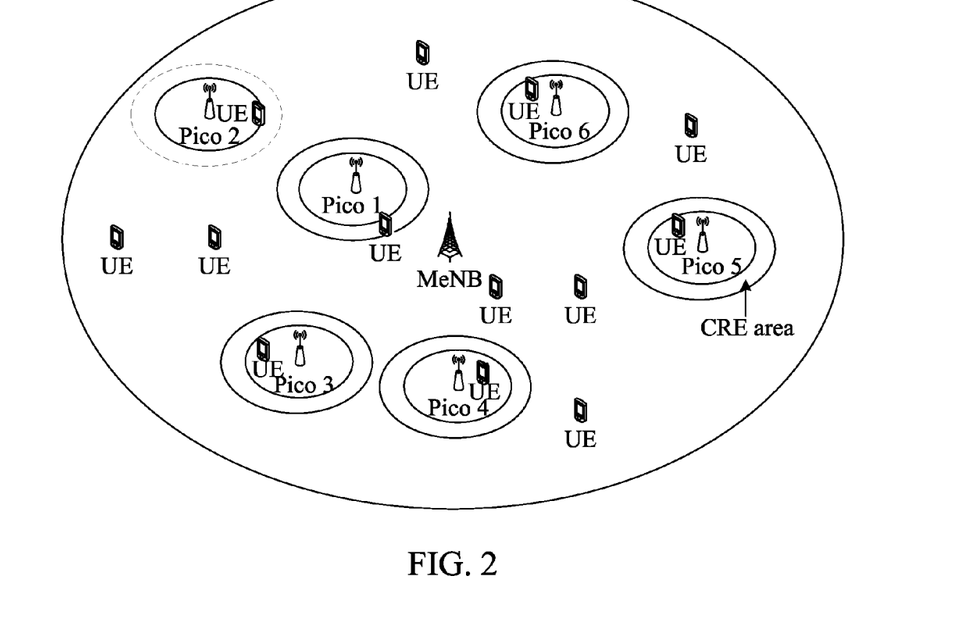
FIG. 2 is a schematic diagram of a network structure of a typical application scenario according to an embodiment of the present invention.
Figure 3:
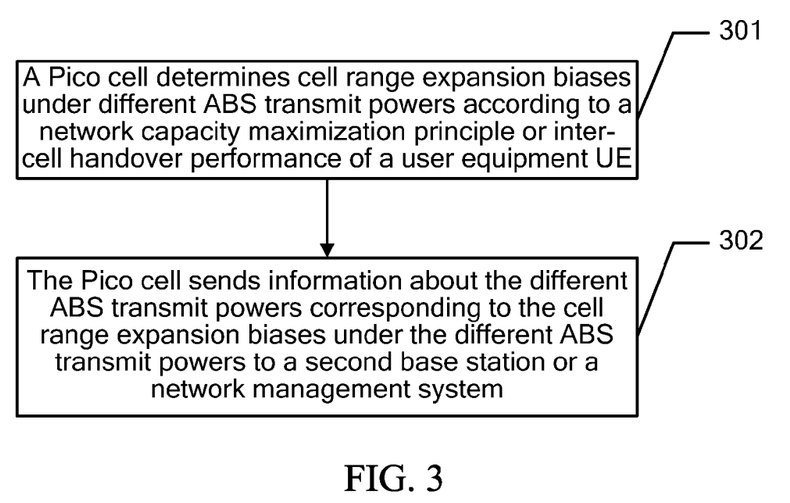
FIG. 3 is a schematic diagram of another embodiment of a method for configuring cell range expansion bias according to an embodiment of the present invention.

FIG. 2 shows a typical application scenario according to the embodiment of the present invention, where a first base station may be one or more Picos, and a second base station may also be one or more MeNBs. FIG. 3 is a scenario of a hybrid network including an MeNB and a Pico. Multiple Pico cells are deployed within coverage of an MeNB. In the embodiment of the present invention, the second base station is an MeNB, but the second base station is not limited to this type of base stations and can be any other base station with relatively high transmit power. Similarly, the first base station is not limited to the Pico, and can be any other base station with relatively low transmit power, such as a micro base station (Micro BS), a home base station (Home BS, Home Base Station), a home base station (Femto BS, Femto Base Station), and a relay base station (Relay BS).

Referring to FIG. 3, another embodiment of a method for configuring cell range expansion bias provided by an embodiment of the present invention includes the following steps.

301. A Pico cell determines cell range expansion biases under different ABS transmit powers according to a network capacity maximization principle or inter-cell handover performance of a user equipment UE.

For example, the Pico cell determines the CRE biases with a maximized network capacity under different ABS transmit powers according to a network capacity calculated according to a preset initial range of the CRE biases under the different ABS transmit powers, where the preset initial range of the CRE biases under the different ABS transmit powers may be preset by a second base station or a network management system.

Further, the Pico cell can traverse, according to a preset step, the preset initial ranges of the CRE biases under the different ABS transmit powers to calculate the network capacity, and determine the CRE biases with the maximized network capacity under the different ABS transmit powers according to the network capacity calculated under different CRE biases.

The preset initial range of the CRE biases may be a value corresponding to maximized system capacity, and the CRE bias with the maximized network capacity may be measured using a network throughput or a spectral efficiency optimized value within the initial range of the CRE bias. A CRE bias definite value that is set with the maximized network capacity can be obtained as follows: estimating the network capacity under the different CRE bias values according to RSRP information of a cell and a neighboring cell measured by the UE, so as to determine the CRE bias that maximizes the network capacity. For example, traverse, from 0, to the maximum configurable CRE bias value within the preset initial range of the CRE bias at a step of 0.5 dB, so as to determine the CRE bias that maximizes the network capacity.

To determine the CRE bias, the maximum value of the cell expansion bias may also be determined, according to a threshold of the handover performance of the UE between the macro base station and the Pico cell, as the CRE bias that is configured by the second base station or the network management system under the different ABS transmit powers for the first base station. The handover performance threshold may be preset according to a requirement, and may include a handover success rate threshold, a UE call drop rate threshold, and a ping-pong handover rate threshold of the UE between the macro base station and the Pico cell. Specifically, the CRE bias corresponding to the minimum threshold of the handover success rate, the maximum threshold of the call drop rate, and the maximum threshold of the ping-pong handover rate may be used as the CRE bias of the Pico cell.

Optionally, under different ABS transmit powers, the first base station determines the CRE bias according to the SINR information measured by UEs within coverage of the first base station. Specifically, a user of the macro base station is unmounted to the first base station according to the CRE bias, where the CRE bias meets a requirement that an SINR provided by the first base station for the macro base station user is greater than or equal to a minimum SINR required by a decoding control channel of the user so that call drop does not occur on the user.

302. The Pico cell sends information about the different ABS transmit powers corresponding to the cell range expansion biases under the different ABS transmit powers to the second base station or the network management system.

In a single-carrier system, the Pico cell sends the information about the different ABS transmit powers corresponding to the cell range expansion biases under the different ABS transmit powers to the second base station or the network management system.

However, in a multi-carrier system, the Pico cell also sends carrier information corresponding to the cell range expansion biases under the different ABS transmit powers to the second base station or the network management system, so that the second base station or the network management system is capable of configuring the CRE biases under the different ABS transmit powers under different carriers for the first base station.

Further, the first base station sends, through an X2 interface, the information about the different ABS transmit powers corresponding to the CRE biases under the different ABS transmit powers to the second base station, or sends, through a northbound interface, the information about the different ABS transmit powers corresponding to the CRE biases under the different ABS transmit powers to the network management system. The northbound interface is an interface provided for another vendor or operator to perform access and management, and is responsible for processing a request packet from an upper-layer network management system.

As an implementation manner, the Pico cell may also generate a cell range expansion bias list according to the information about the cell expansion bias corresponding to the maximized network capacity, and send the list to the second base station or the network management system.

It should be noted that the cell range expansion bias list includes the different ABS powers and the corresponding CRE biases when an ABS power level is not stipulated between the first base station and the second base station. A specific form of the cell expansion bias list is shown in Table 1.

TABLE 1

| ABS Transmit Power (Watt) | CRE Bias Definite Value Determined by a Pico Cell |
|---|---|
| 0 | 11 dB |
| 1 | 10 dB |
| 4 | 8 dB |

Further, in the multi-carrier system, a specific form of the cell range expansion bias list under different member carriers is shown in Table 2.

TABLE 2

| Member Carrier 1 | | Member Carrier 2 | |
|---|---|---|---|
| | | ABS | CRE Bias |
| ABS Transmit Power (Watt) | CRE Bias Definite Value Determined by a Pico Cell | Transmit Power (Watt) | Definite Value Determined by a Pico Cell |
| 0 | 11 dB | 0 | 11 dB |
| 1 | 10 dB | 0.5 | 10.5 dB |
| 4 | 8 dB | 2 | 9 dB |

Specifically, the cell expansion bias list includes a sequence of CRE biases when the ABS power level is stipulated between the first base station and the second base station. A specific form of the cell expansion bias list is shown in Table 3.

TABLE 3

| CRE Bias Definite Value Determined by a Pico Cell |
|---|
| 11 dB |
| 10 dB |
| 8 dB |

Further, in the multi-carrier system, a specific form of the cell expansion bias list under different member carriers is shown in Table 4.

TABLE 4

| Member Carrier 1 CRE Bias Definite Value Determined by a Pico Cell | Member Carrier 2 CRE Bias Definite Value Determined by a Pico Cell |
|---|---|
| 11 dB | 11 dB |
| 10 dB | 10.5 dB |
| 8 dB | 9 dB |

The foregoing cell expansion bias list is sent to the macro base station through the X2 interface, or the foregoing cell expansion bias list is sent to the network management system through the northbound interface, and then the macro base station or the network management system configures the CREs of the Pico cells according to the different Pico cells, the different ABS output powers, and the foregoing lists. However, parameters are obtained not only according to the foregoing lists, and content in the foregoing Tables 1 to 4 is only an example and is not intended to limit the present invention.

In the embodiment of the present invention, the Pico cell determines the cell range expansion biases under the different ABS transmit powers according to the network capacity maximization principle or the inter-cell handover performance of the user equipment UE. Therefore, under the different ABS transmit powers, the network capacity maximization or the inter-cell handover performance of the UE is measured, and the CRE biases determined in the different Pico cells accord more with current Pico cell network status and are more reasonably configured. After that, the determined CRE biases are sent to the macro base station through the X2 interface, or to the network management system through the northbound interface, so that the macro base station or the network management system configures the CREs of the Pico cells according to mapping between the CRE biases under the different ABS output powers and in the different Pico cells, thereby avoiding network resource waste due to a too small CRE bias configured in a unified manner or UE call drop due to a too large CRE bias configured in a unified manner when the macro base station or the network management system performs configuration for the Pico cells.

Figure 4:
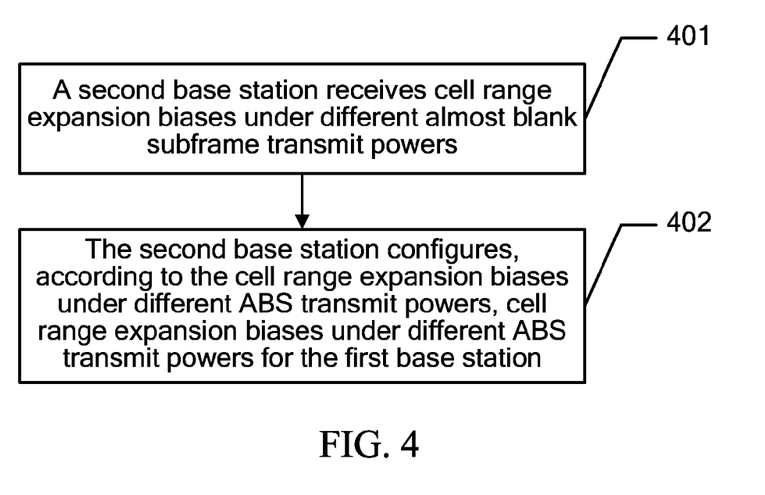
FIG. 4 is a schematic diagram of another embodiment of a method for configuring cell range expansion bias according to an embodiment of the present invention.

The method of configuring cell range expansion bias is described hereinbefore from the first base station side. The following describes the method from the second base station side. Referring to FIG. 4, another embodiment of a method for configuring cell range expansion bias provided by an embodiment of the present invention includes the following steps.

401. The second base station receives cell range expansion biases under different almost blank subframe transmit powers.

The cell range expansion biases under the different ABS transmit powers are determined by the first base station.

Further, the second base station receives, through an X2 interface, the cell range expansion biases under the different ABS transmit powers.

402. The second base station configures, according to the cell range expansion biases under the different ABS transmit powers, the cell range expansion biases under the different ABS transmit powers for the first base station.

In the embodiment of the present invention, a second base station receives cell range expansion biases under different ABS transmit powers. Specifically, the second base station receives, through an X2 interface, the cell range expansion biases under the different ABS transmit powers. Because the CRE biases under the different ABS transmit powers are determined by a first base station, and the second base station performs configuration according to the CRE biases determined by the first base station itself, the CRE bias configuration is more reasonable, thereby avoiding network resource waste due to a too small CRE bias or UE call drop due to a too large CRE bias.

It should be noted that in the foregoing, configuration of the CRE biases for the first base station is performed by the second base station, and may also be performed by a network management system. The network management system receives, through a northbound interface, the cell range expansion biases under the different ABS transmit powers, and configures, according to the cell range expansion biases under the different ABS transmit powers, the CRE biases under the different ABS transmit powers for the first base station.

Figure 5:
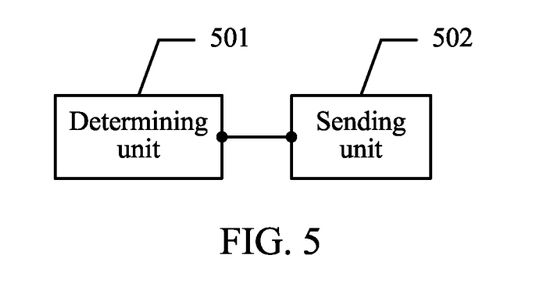
FIG. 5 is a schematic diagram of an embodiment of a device for configuring cell range expansion bias according to an embodiment of the present invention.

The following describes a device for configuring cell range expansion bias according to an embodiment of the present invention. Referring to FIG. 5, an embodiment of the device for configuring cell range expansion bias according to an embodiment of the present invention includes a number of units. A determining unit 501 is adapted to determine cell range expansion biases under different ABS output powers. A sending unit 502 is adapted to send the cell range expansion biases under the different almost blank subframe ABS transmit powers to a second base station or a network management system.

In the embodiment of the present invention, for a specific process for units of the device for configuring the cell range expansion bias to implement respective functions, reference may be made to the relevant description in the embodiment shown in FIG. 1, and details are not repeated here.

In the embodiment of the present invention, a determining unit 501 determines cell range expansion biases under different ABS output powers, where the cell range expansion biases are used by a second base station or a network management system to configure the cell range expansion biases of a first base station; the sending unit 502 sends the cell range expansion biases under the different ABS transmit powers to the second base station or the network management system; therefore, the first base station determines the CRE biases under the different ABS transmit powers and sends the CRE biases to the second base station or the network management system, and the second base station or the network management system configures the CRE biases respectively according to the CRE biases determined by the first base station. Therefore, the CRE bias configuration is more reasonable, thereby avoiding network resource waste due to a too small CRE bias or UE call drop due to a too large CRE bias.

Figure 6:
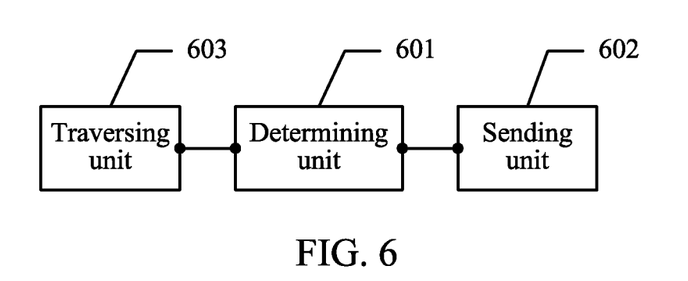
FIG. 6 is a schematic diagram of another embodiment of a device for configuring cell range expansion bias according to an embodiment of the present invention.

For easier understanding, the following describes in detail a device for configuring cell range expansion bias according to an embodiment of the present invention. Referring to FIG. 6, another embodiment of a device for configuring cell range expansion bias according to an embodiment of the present invention. A determining unit 601 is adapted to determine cell range expansion biases under different ABS transmit powers according to a network capacity maximization principle or inter-cell handover performance of a UE. A sending unit 602 is adapted to send the cell range expansion biases under the different ABS transmit powers to a second base station or a network management system.

Further, the determining unit 601 is specifically adapted to determine the cell range expansion biases with the maximized network capacity under different ABS transmit powers according to a network capacity calculated according to a preset initial range of the cell range expansion biases under the different ABS transmit powers.

The determining unit 601 may be adapted to determine, according to a preset threshold of the inter-cell handover performance, a maximum value of the preset initial range of the cell range expansion biases under the different ABS transmit powers.

It should be noted that, the device for configuring cell range expansion bias according to the embodiment of the present embodiment may further include a traversing unit 603, which is adapted to traverse, according to a preset step, the preset initial range of the cell range expansion biases under the different ABS transmit powers to calculate the network capacity. The sending unit 602 determines, according to the network capacity, the CRE biases with the maximized network capacity under the different ABS transmit powers.

The sending unit 602 specifically sends information about the different ABS transmit powers corresponding to the cell range expansion biases under the different ABS transmit powers to the second base station or the network management system; or in a multi-carrier system, the sending unit 602 sends carrier information corresponding to the cell range expansion biases under the different ABS transmit powers to the second base station or the network management system.

In the embodiment of the present invention, for a specific process for units of the device for configuring the cell range expansion bias to implement respective functions, reference may be made to relevant descriptions in the embodiments shown in FIG. 1 and FIG. 3, and details are not repeated herein.

The device according to the embodiment of the present invention may include different combinations of the foregoing units according to different functions to be implemented.

In the embodiment of the present invention, a determining unit 601 determines cell range expansion biases under different ABS transmit powers according to a network capacity maximization principle or inter-cell handover performance of a user equipment UE. Therefore, under the different ABS transmit powers, the network capacity maximization or the inter-cell handover performance of a UE is measured, and the CRE biases determined in different Pico cells accord more with current Pico cell network status and are more reasonably configured. After that, a sending unit 602 sends the determined CRE biases to a macro base station through an X2 interface, or to a network management system through a northbound interface, to configure the CREs of the Pico cells according to mapping between the CRE biases under the different ABS output powers and in the different Pico cells. This avoids network resource waste due to a configured too small CRE bias or the UE call drop due to a configured too large CRE bias when the macro base station or the network management system performs configuration for the Pico cells.

Figure 7:
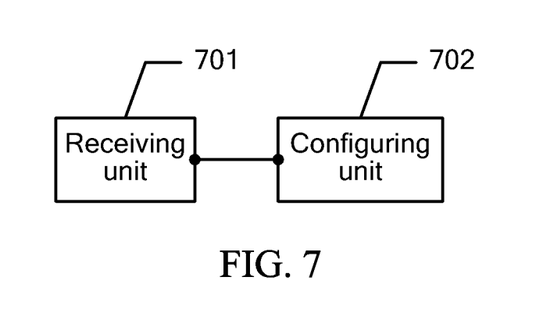
FIG. 7 is a schematic diagram of another embodiment of a device for configuring cell range expansion bias according to an embodiment of the present invention.

Referring to FIG. 7, another embodiment of a device for configuring cell range expansion bias according to an embodiment of the present invention. A receiving unit 701 is adapted to receive cell range expansion biases under different almost blank subframe ABS transmit powers. A configuring unit 702 is adapted to configure, according to the cell range expansion biases under the different ABS transmit powers, the cell range expansion biases under the different ABS transmit powers for a first base station. The cell range expansion biases under the different ABS transmit powers are determined by the first base station.

Further, the receiving unit 701 is further adapted to receive, through an X2 interface or a northbound interface, the cell range expansion biases under the different almost blank subframe ABS transmit powers.

In the embodiment of the present invention, for a specific process for units of the device for configuring cell range expansion bias to implement respective functions, reference may be made to relevant description in the embodiment shown in FIG. 4, and details are not repeated herein.

In the embodiment of the present invention, because the CRE biases under the different ABS transmit powers are determined by a first base station, and a second base station performs configuration according to the CRE biases determined by the first base station itself, CRE bias configuration is more reasonable, thereby avoiding network resource waste due to a too small CRE bias configured in a unified manner or UE call drop due to a too large CRE bias configured in a unified manner.

Figure 8:
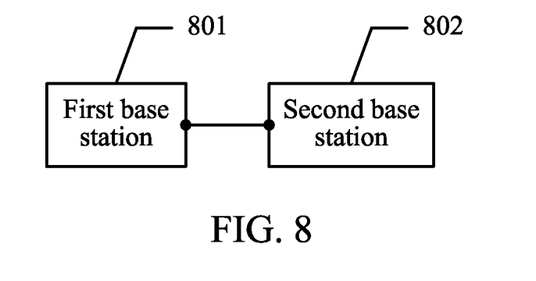
FIG. 8 is a schematic diagram of an embodiment of a system for configuring cell range expansion bias according to an embodiment of the present invention.

An embodiment of the present invention further provides a system for configuring cell range expansion bias. Referring to FIG. 8, the system for configuring cell range expansion bias includes a first base station 801 and a second base station 802. The first base station 801 is adapted to determine cell range expansion biases under different almost blank subframe ABS transmit powers and to send the cell range expansion biases under the different almost blank subframe ABS transmit powers to the second base station or a network management system. The second base station 802 is adapted to receive the cell range expansion biases under different almost blank subframe ABS transmit powers and to configure, according to the cell range expansion biases under the different ABS transmit powers, the cell range expansion biases under the different ABS transmit powers for the first base station. The cell range expansion biases under the different ABS transmit powers are determined by the first base station.

It should be noted that, the foregoing second base station may also be the network management system.

An embodiment of the present invention further provides a calculation program product for configuring cell range expansion bias, including a storage medium and a code for implementing the foregoing method for configuring cell range expansion bias.

A person of ordinary skill in the art should understand that all or a part of the steps in the foregoing embodiment method may be implemented by a program instructing relevant hardware. The program may be stored in a computer readable storage medium, and the storage medium may be a read-only memory, a magnetic disk, or an optical disk.

The method, device, and system for configuring cell range expansion bias provided by the present invention are described in detail in the foregoing; persons of ordinary skill in the art can make variations and modifications to the present invention in terms of the specific implementations and application scopes according to the ideas of the present invention. Therefore, the specification shall not be construed as a limit to the present invention.

What is claimed is:

1. A method for configuring cell range expansion biases, the method comprising:
   determining, by a first base station, cell range expansion biases corresponding to different almost blank subframe (ABS) transmit powers that are used by the first base station for transmission to a user equipment (UE) according to a network performance requirement, wherein each of the cell range expansion biases is mapped to one of the different ABS transmit powers, and wherein the cell range expansion biases are used for configuring cell range expansion of the first base station; and
   sending, by the first base station, the cell range expansion biases corresponding to the different ABS transmit powers to a second base station or a network management system.

2. The method according to claim 1, wherein determining the cell range expansion biases corresponding to the different ABS transmit powers comprises determining the cell range expansion biases corresponding to the different ABS transmit powers according to a network capacity maximization principle or inter-cell handover performance of a UE.

3. The method according to claim 2, wherein determining the cell range expansion biases corresponding to the different ABS transmit powers comprises determining, according to a network capacity calculated according to a preset initial range of the cell range expansion biases under the different ABS transmit powers, the cell range expansion biases with a maximized network capacity under the different ABS transmit powers.

4. The method according to claim 3, wherein determining the cell range expansion biases comprises:
   traversing, by the first base station according to a preset step, the preset initial range of the cell range expansion biases under the different ABS transmit powers to calculate the network capacity; and
   determining, by the first base station according to the network capacity, the cell range expansion biases with the maximized network capacity under the different ABS transmit powers.

5. The method according to claim 2, wherein determining the cell range expansion biases corresponding to the different ABS transmit powers comprises determining, according to a preset threshold of the inter-cell handover performance of the UE, a maximum value of a preset initial range of the cell range expansion biases under the different ABS transmit powers.

6. The method according to claim 5, wherein the preset initial range of the cell range expansion biases under the different ABS transmit powers is preset by the second base station or the network management system.

7. The method according to claim 1, wherein the method further comprises sending, by the first base station, information about the different ABS transmit powers corresponding to the cell range expansion biases under the different ABS transmit powers to the second base station or the network management system.

8. The method according to claim 1, wherein the method is performed in a multi-carrier system and further comprises sending, by the first base station, carrier information corresponding to the cell range expansion biases under the different ABS transmit powers to the second base station or the network management system.

9. A method for configuring cell range expansion biases, the method comprising:
  receiving, by a second base station or a network management system from a first base station, cell range expansion biases under different almost blank subframe (ABS) transmit powers that are used by the first base station for transmission to a user equipment (UE), wherein each of the cell range expansion biases is determined by the first base station according to a network performance requirement, and each of the cell range expansion biases is mapped to a corresponding ABS transmit power in the different ABS transmit powers; and
  configuring, by the second base station or the network management system according to the received cell range expansion biases under the different ABS transmit powers, cell range expansion biases under different ABS transmit powers for transmission by the first base station to the UE.

10. The method according to claim 9, wherein receiving the cell range expansion biases under different ABS transmit powers comprises receiving, by the second base station through an X2 interface, the cell range expansion biases under the different ABS transmit powers.

11. The method according to claim 9, wherein receiving the cell range expansion biases under different ABS transmit powers comprises receiving, by the network management system through a northbound interface, the cell range expansion biases under the different ABS transmit powers.

12. A base station comprising:
  a processor programmed to determine cell range expansion biases corresponding to different almost blank subframe (ABS) transmit powers that are used by the base station for transmission to a user equipment (UE) in accordance with a network performance requirement, wherein each of the cell range expansion biases is mapped to one of the different ABS transmit powers, and wherein the cell range expansion biases are used for configuring cell range expansion of the base station; and
  a transmitter coupled to the processor to send the cell range expansion biases under the different almost blank subframe transmit powers to a second base station or a network management system.

13. The base station according to claim 12, wherein the processor is programmed to determine the cell range expansion biases corresponding to the different ABS transmit powers according to a network capacity maximization principle or inter-cell handover performance of a user equipment (UE).

14. The base station according to claim 13, wherein the processor is programmed to determine, according to a network capacity calculated according to a preset initial range of the cell range expansion biases under the different ABS transmit powers, cell range expansion biases with a maximized network capacity under different ABS transmit powers.

15. The base station according to claim 14, wherein the processor is programmed to traverse, according to a preset step, the preset initial range of the cell range expansion biases under the different ABS transmit powers to calculate the network capacity and to determine, according to the network capacity, the cell range expansion biases with the maximized network capacity under the different ABS transmit powers.

16. The base station according to claim 13, wherein the processor is programmed to determine, according to a preset threshold of the inter-cell handover performance of the UE, a maximum value of a preset initial range of the cell range expansion biases under the different ABS transmit powers.

17. The base station according to claim 12, wherein the transmitter is configured to send information about the different ABS transmit powers corresponding to the cell range expansion biases under the different ABS transmit powers to the second base station or the network management system.

18. The base station according to claim 12, wherein the transmitter is configured to send, in a multi-carrier system, carrier information corresponding to the cell range expansion biases under the different ABS transmit powers to the second base station or the network management system.

19. A base station comprising:
  a processor; and
  a receiver coupled to the processor to receive from a second base station and provide, to the processor, cell range expansion biases under different almost blank subframe (ABS) transmit powers that are used by the second base station for transmission to a user equipment (UE), wherein each of the cell range expansion biases is determined by the second base station corresponding to one of the different ABS transmit powers based on a network Performance requirement so that a mapping is generated between each of the cell range expansion and one of the different ABS transmit powers; and
  wherein the processor is programmed to configure, according to the cell range expansion biases under the different ABS transmit powers, cell range expansion biases under different ABS transmit powers for transmission by the second base station to the UE.

20. The base station according to claim 19, wherein the receiver is configured to receive the cell range expansion biases under the different ABS transmit powers through an X2 interface or a northbound interface.

* * * * *

UNITED STATES PATENT AND TRADEMARK OFFICE
CERTIFICATE OF CORRECTION

PATENT NO. : 9,681,392 B2  
APPLICATION NO. : 14/537162  
DATED : June 13, 2017  
INVENTOR(S) : Yanzan Sun Page 1 of 1

It is certified that error appears in the above-identified patent and that said Letters Patent is hereby corrected as shown below:

In the Claims

In Column 12, Line 52, Claim 19, delete "network Performance requirement" and insert --network performance requirement--.

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*